Oct. 29, 1963    C. VAN DER LELY ETAL    3,108,424
SIDE DELIVERY RAKE

Original Filed Nov. 28, 1955    2 Sheets-Sheet 1

INVENTOR.
CORNELIS & ARY VAN DER LELY
BY
Mason, Mason, & Albright

Oct. 29, 1963   C. VAN DER LELY ETAL   3,108,424
SIDE DELIVERY RAKE
Original Filed Nov. 28, 1955   2 Sheets-Sheet 2
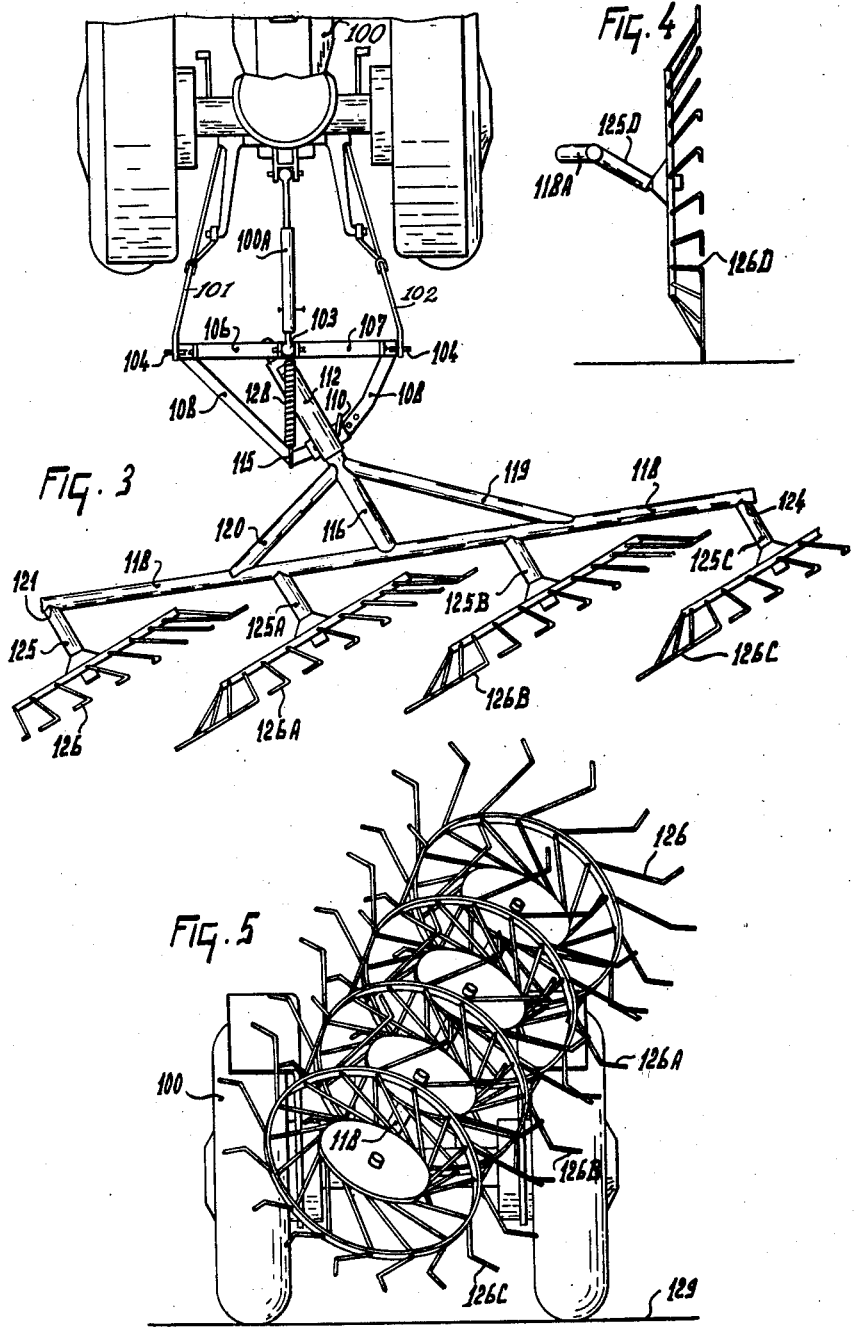
INVENTOR.
CORNELIS & ARY VANDER LELY
BY United States Patent Office 3,108,424
Patented Oct. 29, 1963

3,108,424
SIDE DELIVERY RAKE
Cornelis van der Lely, Zug, Switzerland, and Ary van der Lely, Maasland, Netherlands, assignors to C. van der Lely N.V., Maasland, Netherlands, a Dutch limited-liability company
Original application Nov. 28, 1955, Ser. No. 549,482, now Patent No. 2,933,878, dated Apr. 26, 1960. Divided and this application Apr. 14, 1960, Ser. No. 22,244
6 Claims. (Cl. 56—377)

This invention relates to a raking apparatus which can be attached to the power lift of a tractor provided with a number of freely rotatably raking members. In distinction to earlier proposed raking attachments, the raking members are not mounted on the frame so as to move up and down independently, but rather provide support for the frame during the raking action.

More specifically, the invention is directed to a raking attachment in combination with a tractor having a power lift mechanism including a pair of transversely spaced vertically swingable links, comprising a frame having mounted thereon a plurality of freely rotatable raking members in echelon disposed obliquely to the direction of travel, connecting means provided at transversely spaced points on said frame for pivotally attaching the frame to said links to allow free movement of the frame in a vertical plane and serving to prevent movement of said frame in a lateral direction relative to the direction of movement of the tractor, said raking attachment including at least some of said raking members constituting supporting members for the frame.

This is a division of our application Serial No. 549,482, filed Nov. 28, 1955, to issue as Patent No. 2,933,878, on April 26, 1960.

The invention will be more readily understood by reference to the accompanying drawings and the following description in which a specific embodiment of the inveniton is set forth by way of illustration rather than by way of limitation.

FIGURE 3 shows a plan view of the implement in a working position in which it serves as a tedder, FIGURE 4 shows a side elevation of a modification for mounting rake wheels on the implement shown in FIGURE 1, FIGURE 5 shows the implement shown in FIGURES 1–4 in a position for transportation.

Figure 1:
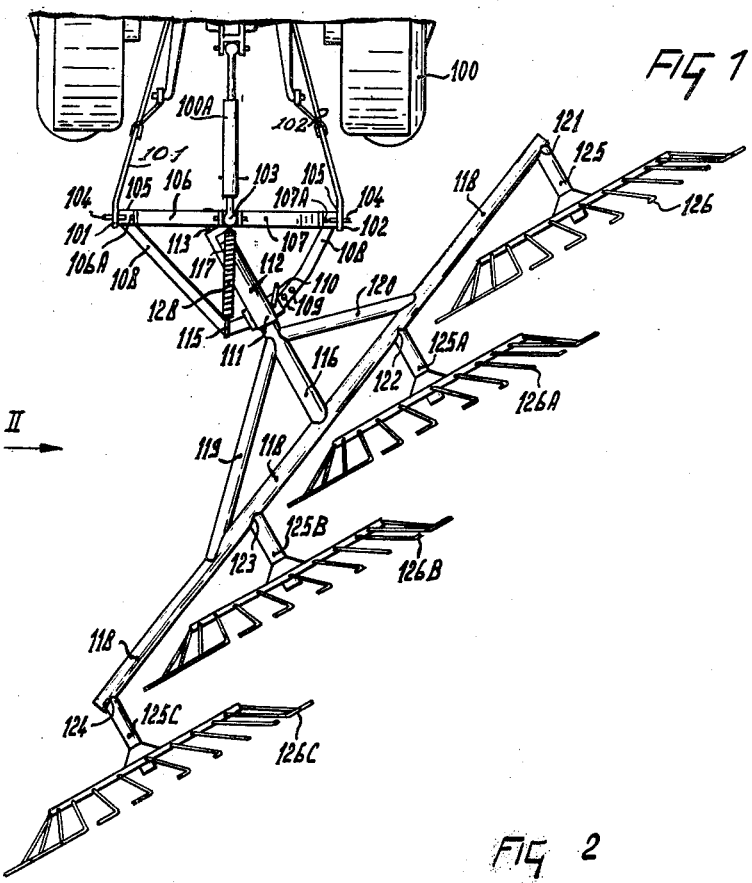
FIGURE 1 shows a plan view of an implement attached to a tractor.
Figure 2:
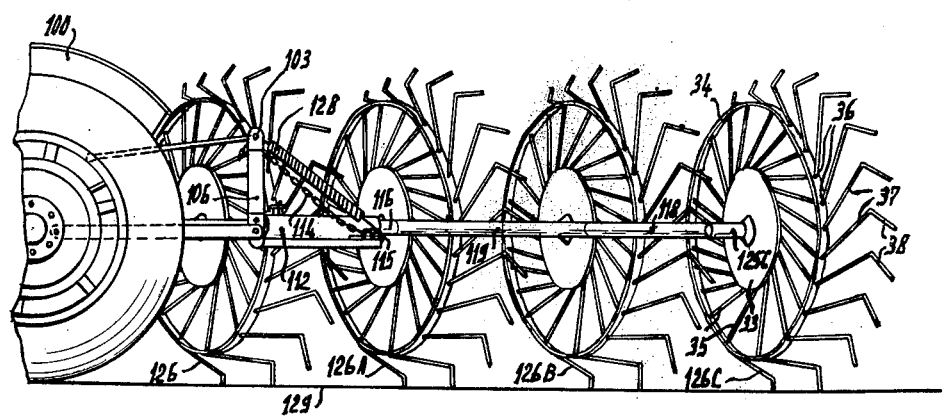
FIGURE 2 shows a side elevation of the implement when viewed in the direction of the arrow II in FIGURE 1.

Referring to FIGURES 1 to 3, a tractor 100 carries a three-point lifting device 100A having three link ends 101, 102 and 103. Pins 104, forming part of the connecting means for connecting the frame of the implement to the tractor, are pivoted in the link ends 101 and 102, the pins constituting the extremities of an axle 105. Two supporting bars 106 and 107 extending obliquely upwards are hinged to the axle 105 at hinges 106A and 107A, the upper ends of the supporting bars 106 and 107 being hinged to the link end 103.

A horizontal bow 108 is attached to axle 105. Bow 108 includes a portion with holes 109 which co-operate with a locking pin 110. In order to adjust the effective working width of the implement, end 111 of sleeve 112 is slideable along the aforesaid portion of bow 108 and has a further hole for pin 110 which can be secured in various positions depending upon which one of the holes 109 registers with the hole in the end 111 to provide an entry for the pin 110. Thus pin 110 secures bow 108 and sleeve 112 against relative angular movement. The other end 113 of sleeve 112 is hingedly connected about a vertical axis to axle 105.

A spring 128 connects the link end 103 by means of a hook 115 to bow 108. By means of this spring 128 the lifting device 100A at least partially supports the weight of the frame since the latter is hingedly connected to the lifting of the tractor about a horizontal axis through pins 104 lying transverse to the direction of travel. A chain 114 (see FIGURE 2) also connects line end 103, by means of hook 115, to bow 108.

Shaft or second frame beam 116 is rotatably supported in sleeve 112, and can be secured against rotation in any one of several positions therein by means of a pin 117 which can be entered in a hole in the sleeve 112 and in a desired hole of several holes in the shaft.

An end of shaft or second frame beam 116 which comprises an elongated frame beam is connected to the center of tube or first frame beam 118 of the frame of the implement, the connection being reinforced by means of struts 119 and 120. Four arms 125, 125A, 125B and 125C parallel to the shaft 116 are immovably attached to tube 118 at 121, 122, 123 and 124. Rake wheels 126, 126A, 126B and 126C are freely rotatable on arms 125, 125A, 125B and 125C, respectively. Each of said rake wheels consists of a hub 33 (see FIGURE 2), a rim 34 and steel wires 35, each of the latter being attached at one end to the hub 33 and passing through apertures in the rim 34. On the inner side of rim 34, steel wires 35 are located in the plane of rim 34 and are non-radial. Just outside rim 34, each steel wire is bent at 36 to form a tine 38 and a support 37 for the tine. Each tine is substantially parallel to that part of steel wire 35 which is located at the inner side of rim 34.

Rake wheels 126, 126A, 126B and 126C constitute ground engaging members so that the frame in operative position maintains itself at substantially the same distance above the ground.

In the construction of the implement which is shown in FIGURES 1 and 2, the frame can easily be inverted. It is only necessary to lift the frame a sufficient height from the ground 129 by means of the lifting device of the tractor, and subsequently to turn the shaft 116, in the sleeve 112, through 180°, and when it is then lowered, it will stand on the ground 129 in the position shown in FIGURE 3.

In the working positions shown in FIGURES 1 and 3, the implement is, respectively, a side delivery rake and a tedder.

It is preferable not to secure shaft 116, in sleeve 112 in the working positions, but rather to allow the shaft to turn through a small angle so as to take account of the unevenness of the ground thereby permitting the weight of the frame to be taken on rake wheels 126, 126A, 126B and 126C and the lifting device.

With reference to FIGURE 4, it has been found advantageous to have tube 118, when the implement serves as a side delivery rake (as shown in FIGURE 1), at a higher location than the arms of the rake wheels, i.e. in the position 118A. As a result, arm supports 125D are arranged to extend obliquely upwards from rake wheel 126D and high windrows will seldom contact the tube 118A. In the working position in which the implement serves as a tedder, the tube 118A is then situated lower than the arms of the rake wheels, but, of course, the material will not be heaped up to such an extent during tedding as occurs in side delivery raking.

The implement shown in FIGURES 1 to 4 can be lifted to the position shown in FIGURE 5 in order to facilitate transportation thereof—it being obvious that in this position the implement occupies less transverse space than in its working positions. If the lifting device of the tractor is suitably arranged, the transportation position can easily be attained by lifting the shaft 116 and then securing it in the required position in the sleeve 112.

After completion of the transportation, the implement can be lowered into either the position in which it can serve as a side delivery rake or the position in which it can serve as a tedder depending upon the direction of rotation of the implement prior to lowering.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

We claim:

1. A side delivery rake for laterally displacing hay or other material lying on the ground comprising a tractor lift mechanism having a pair of longitudinally spaced bearing portions, draft means having two parts, the first of said parts being adapted to receive the second of said parts, the second of said parts being selectively rotatable relative to the first of said parts, the first of said parts having longitudinally spaced parts having bearing engagement with said gearing portions, a rake beam rigidly connected to the rear portion of said second part of said draft means, an echelon of overlapping rake wheels mounted on said rake beam whereby when said lift mechanism is actuated said rake beam will be lifted, and a resilient device for partially supporting said rake beam.

2. The structure of claim 1 wherein said resilient device comprises a spring having one of its ends connected to said draft means.

3. The structure of claim 1 wherein said resilient device comprises a spring having both of its ends directly connected to said draft means.

4. The structure of claim 1 wherein said resilient device comprises a coiled spring having one of its ends connected to said first part and the opposite end connected to said second part.

5. The structure of claim 1 wherein means is provided including said draft means for converting the same from a side delivery rake to a tedder.

6. The structure of claim 1 wherein means is provided including said draft means for raising said rake from the ground whereby said rake may be rotated and lowered whereby to convert said rake to a tedder.

References Cited in the file of this patent

UNITED STATES PATENTS

| | | |
|---|---|---|
| 2,532,652 | Wray | Dec. 5, 1950 |
| 2,621,465 | Klemm | Dec. 16, 1952 |
| 2,680,343 | Enos | June 8, 1954 |
| 2,689,446 | Sorrels | Sept. 21, 1954 |
| 2,876,613 | Van der Lely et al. | Mar. 10, 1959 |
| 2,933,878 | Van der Lely et al. | Apr. 26, 1960 |

FOREIGN PATENTS

| | | |
|---|---|---|
| 856,809 | Germany | Nov. 24, 1952 |